United States Patent [19]

Maucher

[11] Patent Number: 4,548,310

[45] Date of Patent: * Oct. 22, 1985

[54] TORQUE TRANSMITTING DEVICE

[75] Inventor: Paul Maucher, Sasbach, Fed. Rep. of Germany

[73] Assignee: Luk Lamellen Und Kupplungsbau GmbH, Bühl, Fed. Rep. of Germany

[*] Notice: The portion of the term of this patent subsequent to Oct. 23, 2001 has been disclaimed.

[21] Appl. No.: 654,038

[22] Filed: Sep. 21, 1984

Related U.S. Application Data

[63] Continuation of Ser. No. 382,565, May 27, 1982, abandoned.

[30] Foreign Application Priority Data

May 29, 1981 [DE] Fed. Rep. of Germany ....... 3121376

[51] Int. Cl.⁴ .............................................. F16D 3/66
[52] U.S. Cl. ............................... 192/106.2; 192/70.17; 192/106.1; 464/68
[58] Field of Search ............... 192/106.2, 106.1, 70.17; 464/68

[56] References Cited

U.S. PATENT DOCUMENTS

| | | | |
|---|---|---|---|
| 2,613,515 | 10/1952 | Crutchley | 464/68 |
| 3,327,820 | 6/1967 | Maurice | 192/106.2 X |
| 3,802,541 | 4/1974 | Schneider | 192/70.17 X |
| 3,931,876 | 1/1976 | Beeskow et al. | 192/106.2 |
| 3,948,373 | 4/1976 | Worner | 192/70.17 X |
| 4,018,320 | 4/1977 | Schrape et al. | 192/106.2 |
| 4,036,341 | 7/1977 | Beeskow et al. | 192/106.2 |
| 4,044,874 | 8/1977 | Worner | 464/68 X |
| 4,378,869 | 4/1983 | Friedmann | 192/106.2 |
| 4,478,326 | 10/1984 | Rotter | 192/70.17 X |

FOREIGN PATENT DOCUMENTS 1600194 1/1970 Fed. Rep. of Germany .

Primary Examiner—Rodney H. Bonck
Attorney, Agent, or Firm—Peter K. Kontler

[57] ABSTRACT

A clutch plate whose output assembly is constituted by a rotary hub and a radial flange, and whose input assembly has an annular carrier of friction linings and an annular cheek rigid with and spaced apart from the carrier so that the flange finds room between the cheek and the carrier. The flange can rotate relative to the carrier and cheek against the opposition of coil springs in registering windows of the flange, carrier and cheek. A first torsional vibration damping unit opposes at least a certain part of angular movement between the flange and the input assembly and has friction generating disc disposed at one side as well as an annular dished spring disposed at the other side of the flange and bearing directly against the friction generating disc. The flange has apertures receiving with play axially disposed arms of the dished spring and/or friction generating disc. Friction pads are inserted between the dished spring and the carrier or cheek as well as at both sides of the friction generating disc. A second torsional vibration damping unit is installed between the flange and the carrier or cheek and is effective during each stage of angular movement of the flange relative to the input assembly or vice versa.

18 Claims, 3 Drawing Figures

TORQUE TRANSMITTING DEVICE

This application is a continuation of application Ser. No. 382,565, filed May 27, 1982, now abandoned.

CROSS-REFERENCE TO RELATED CASE

The clutch plate of the present invention is somewhat similar to the clutch plate which is disclosed in commonly owned copending application Ser. No. 376,623 filed May 10, 1982 by Gerhard Rotter and now U.S. Pat. No. 4,478,326.

BACKGROUND OF THE INVENTION

The present invention relates to torque transmitting devices in general, and more particularly to improvements in means for damping vibrations which tend to develop when one of two or more rotary assemblies of a torque transmitting device turns relative to the other assembly or assemblies. Typical examples of such torque transmitting devices are clutch plates which are used in friction clutches of automotive vehicles to transmit torque from a driving member to a driven member, e.g., from the crankshaft of an internal combustion engine to the input shaft of a change-speed transmission.

It is known to assemble a friction clutch plate of several (at least three) assemblies one of which is the input assembly and can comprise a disc-shaped carrier of friction linings, another of which is the output assembly and can comprise a rotary hub and a flange on the hub, and a third of which can comprise at least one disc-shaped or plate-like friction generating component. One or more coil springs or analogous energy storing means are interposed between the input and output assemblies to yieldably oppose the limited amount of angular movement between such assemblies, and the third assembly is installed in the path of transmission of power between the input and output assemblies to offer a resistance to relative angular movement at least during part of rotation of the input assembly with reference to the output assembly and/or vice versa. A second component of the third assembly stores energy and urges the aforementioned friction generating component against one of the input and output assemblies. The energy storing component reacts against the other of the input and output assemblies.

A clutch plate of the just outlined character is disclosed, for example, in German Offenlegungsschrift No. 1,600,194. In the clutch plate of this German publication, the carrier of friction linings is non-rotatably secured to a disc-shaped cover, and one side of the cover is adjacent to a friction generating component which is disposed between two friction pads. The other side of the cover is adjacent to the energy storing component which is stressed in the axial direction and constitutes a dished spring serving to insure the generation of necessary friction which opposes the angular movement between the carrier of friction linings and the hub. The radially outermost portion of the energy storing component reacts against the cover, and its innermost portion bears against an adjustable nut which meshes with the hub. The latter extends through the cover and has an enlarged portion or boss at that side of the cover which faces away from the energy storing component. The friction generating component is confined between the boss and the respective side of the cover, i.e., one of the aforementioned friction pads bears against the radially outwardly extending boss and the other friction pad bears against the cover. The friction generating component has edge faces which engage the energy storing means between the input and output assemblies of the clutch plate.

A drawback of the just discussed conventional clutch plate is that it is expensive, mainly because it comprises a relatively large number of complex parts such as an externally threaded hub with a boss, an internally threaded nut, and others. Furthermore, the assembling of the just discussed clutch plate takes up a substantial amount of time. Moreover, the vibrationdamping unit takes up a considerable amount of space, as considered in the axial direction of the clutch plate. Such space is not available in all friction clutches so that the clutch plate of the German publication can be used only in certain types of clutches. Still further, the weight and hence the inertia of the conventional clutch plate is substantial which is highly undesirable, e.g., as regards the synchronizing devices for change-speed transmissions in automotive vehicles.

OBJECTS AND SUMMARY OF THE INVENTION

An object of the invention is to provide a novel and improved torque transmitting device, such as a clutch plate, which is simpler, less expensive and more compact than in heretofore known clutch plates.

Another object of the invention is to provide a lightweight clutch plate whose dimensions, as considered in the axial direction, are a fraction of the dimensions of heretofore known equivalent or similar clutch plates.

A further object of the invention is to provide a torque transmitting device, particularly a clutch plate for use in the friction clutch of an automotive vehicle, wherein the number of component parts is less than in heretofore known clutch plates.

An additional object of the invention is to provide the clutch plate with novel and improved torsional vibration damping means which is not only simple and compact but also sufficiently versatile to find application in many conventional clutch plates.

Another object of the invention is to provide a torque transmitting device with novel and improved torsional vibration damping means which occupies little room, which occupies room that is normally available in a clutch plate, and which ensures the generation of optimal frictional resistance to relative angular movement between the various assemblies of the clutch plate.

A further object of the invention is to provide a clutch plate which embodies the improved torsional vibration damping means but is nevertheless designed in such a way that its inertia is lower than that of heretofore known clutch plates.

Still another object of the invention is to provide a machine, apparatus or the like which embodies the improved clutch plate.

Another object of the invention is to provide a clutch plate which can be used in existing friction clutches or the like as a superior substitute for heretofore known clutch plates.

The invention is embodied in a torque transmitting device, particularly in a clutch plate for use in the friction clutch of an automotive vehicle. The torque transmitting device comprises a rotary output assembly (e.g., a hub having a coaxial radially outwardly extending annular flange) and a rotary input assembly which is coaxial with and serves to transmit torque to the output assembly. The input and output assemblies are rotatable relative to each other through a predetermined angle, and one of these assemblies includes a substantially disc-shaped portion (such as the aforementioned flange of the hub forming part of the output assembly). The torque transmitting device further comprises a set of coil springs or another suitable energy storing means interposed between and arranged to yieldably oppose rotation of the input and output assemblies relative to one another, and a third assembly which constitutes torsional vibration damping means installed in the path of transmission of torque between the input and output assemblies and including a friction generating first component at one side and an axially stressed resilient second component at the other side of the disc-shaped portion. The second component reacts against the other of the input and output assemblies and bears directly against the first component. At least one of the two components extends through the disc-shaped portion of the one assembly, and the two components cooperate to frictionally oppose relative rotation of the input and output assemblies at least through a portion of the aforementioned angle.

The input assembly can comprise two additional disc-shaped portions one of which preferably constitutes an annular carrier of friction linings (if the improved device is a clutch plate) and the other of which can constitute an annular cheek which is rigid with and spaced apart from the carrier so that the disc-shaped portion of the one assembly can find room between the two additional disc-shaped portions.

The second component can constitute an annular dished spring having an outer portion (as considered in the radial direction of the output assembly) which bears directly against the first component and an inner portion which reacts against one of the additional disc-shaped portions, e.g., against the carrier of the input assembly.

The improved torque transmitting device can further comprise second torsional vibration damping means which is interposed between the input and output assemblies and includes an axially stressed resilient element and a friction pad which is adjacent to and is biased by the resilient element. The resilient element reacts against one of the input and output assemblies (e.g., against the carrier of the input assembly) and the friction pad bears against the other of the input and output assemblies (e.g., against the flange of the hub forming part of the output assembly). The second component preferably surrounds the resilient element and/or the friction pad of the second damping means.

The disc-shaped portion of the one assembly can be provided with apertures through which portions (such as axially disposed arms) of the one component extend. For example, the arms can be provided on the first component to be engaged by the radially outermost portion of the second component. The arrangement is preferably such that the portions or arms of the one component extend through the apertures of the disc-shaped portion of the one assembly with limited freedom of angular movement between such disc-shaped portion and the one component.

The first component of the third assembly can be disposed between the flange of the hub forming part of the output assembly and the annular carrier or cheek of the input assembly. The second component of the third assembly is then disposed between the flange of the hub and the annular cheek or carrier of the input assembly.

A friction pad can be interposed between the second component and the other assembly. For example, and if the second component is disposed between the carrier of friction linings and the flange, the friction pad is installed between such carrier and the radially innermost portion of the second component. Another friction pad can be interposed between the first component and the flange of the hub. If desired, the first component can be flanked by two friction pads one of which bears against the flange and the other of which bears against the carrier or cheek of the input assembly, depending upon whether the first component is installed between the flange and the carrier or between the flange and the cheek.

The novel features which are considered as characteristic of the invention are set forth in particular in the appended claims. The improved torque transmitting device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
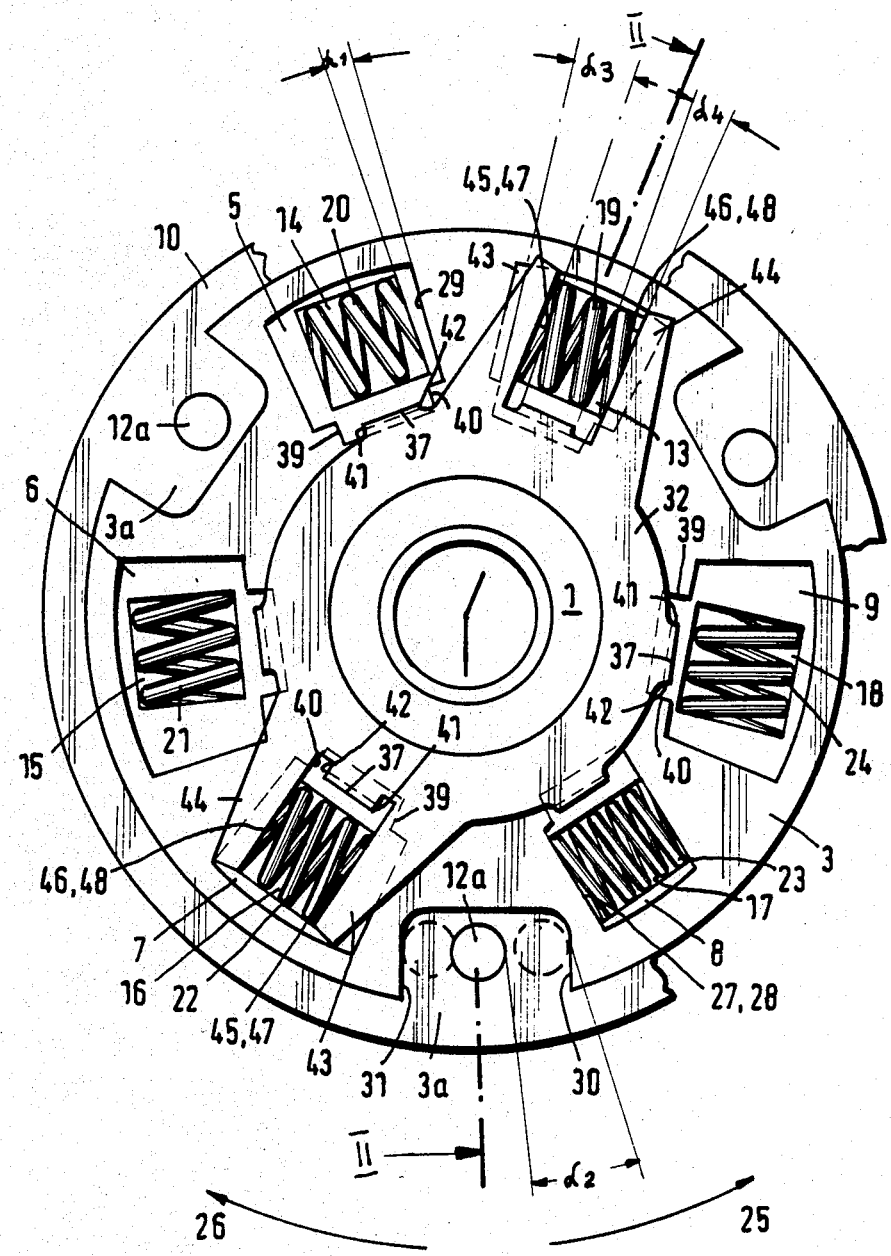
FIG. 1 is a fragmentary elevational view of a torque transmitting device constituting a clutch plate which embodies one form of the invention and wherein the friction generating component of the first or outer torsional vibration damping unit extends through the flange on the hub.
Figure 2:
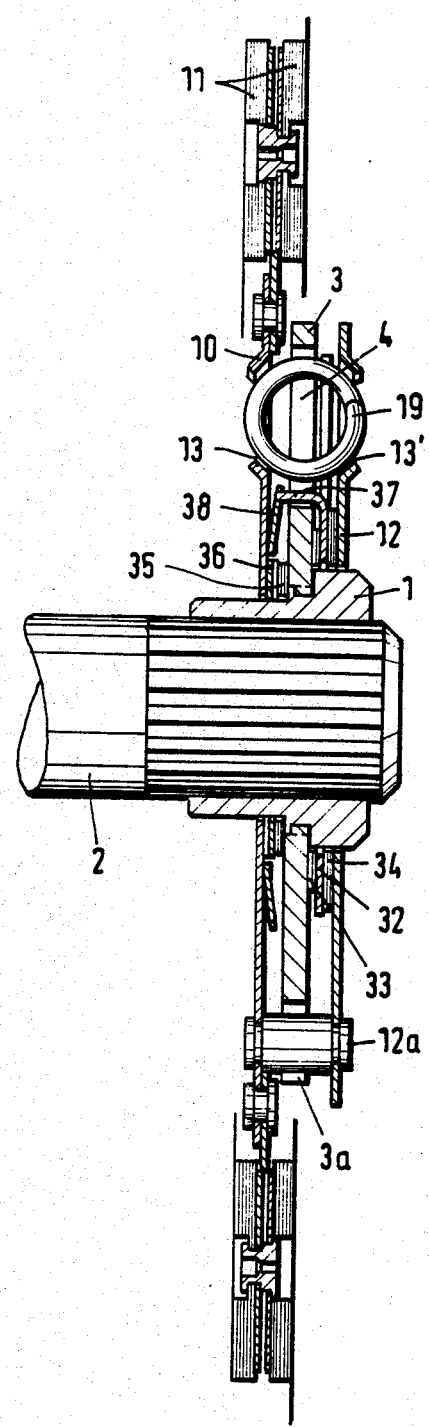
FIG. 2 is a substantially axial sectional view of the clutch plate as seen in the direction of arrows from the line II—II of FIG. 1.

The torque transmitting device which is shown in FIGS. 1 and 2 constitutes a clutch plate and comprises an output assembly including a hub 1 and a disc-shaped portion or flange 3 which is coaxial with and is non-rotatably secured to the hub. The latter can transmit torque to a driven member 2, such as the input shaft of the change-speed transmission in an automotive vehicle. The hub 1 is provided with internal splines for the axially parallel peripheral teeth or ribs of the shaft 2.

The flange 3 is formed with an annulus of windows 4, 5, 6, 7, 8 and 9 for energy storing means in the form of coil springs 19, 20, 21, 22, 23 and 24, respectively.

The hub 1 is surrounded by and is rotatable within limits relative to a disc-shaped annular portion or carrier 10 for two friction linings 11 which are disposed at the opposite sides thereof and flank its radially outermost portion. The carrier 10 forms part of an input assembly which serves to transmit torque to the flange 3 via coil springs 19 to 24 and which further includes a second disc-shaped portion or cheek 12. The latter is also rotatable relative to the hub 1 and is rigidly connected with the carrier 10 by a set of rivets 12a, e.g., by three rivets which alternate with pairs of energy storing coil springs. The rivets 12a not only rigidly couple the carrier 10 to the cheek 12 but also constitute distancing elements which maintain the disc-shaped portions 10 and 12 at a fixed distance from one another, as considered in the axial direction of the hub 1. The marginal portion of the flange 3 is formed with three angularly spaced recesses or notches 3a each of which receives, with substantial play (as considered in the circumferential direction of the hub 1), the intermediate portion of the respective rivet 12a.

The left-hand friction lining 11 of FIG. 2 can be moved into contact with the flywheel on the crankshaft of the internal combustion engine in an automotive vehicle, and the right-hand friction lining 11 can be engaged and urged in a direction to the left, as viewed in FIG. 2, by a pressure plate forming part of a friction clutch which can transmit torque from the crankshaft to the input shaft 2 of the transmission.

The carrier 10 is formed with six windows 13 to 18 each of which registers with a similar window of the cheek 12. FIG. 2 merely shows one (13′) of the six windows in the cheek 12. Each window (13-18) of the carrier 10 and the corresponding window of the cheek 12 registers with one of the windows 4 to 9 in the flange 3. By way of example, and as shown in the upper part of FIG. 2, the window 13 of the carrier 10 registers with the window 4 of the flange 3 as well as with the window 13′ of the cheek 12. These three windows receive portions of the energy storing coil spring 19. The windows 14, 5 and the corresponding window of the cheek 12 receive portions of the coil spring 20; the windows 15, 6 and the corresponding window of the cheek 12 receive portions of the coil spring 21; the windows 16, 7 and the corresponding window of the cheek 12 receive portions of the coil spring 22; the windows 17, 8 and the corresponding window of the cheek 12 receive portions of the coil spring 23; and the windows 18, 9 and the corresponding window of the cheek 12 receive portions of the coil spring 24.

The function of the coil springs 19 to 24 is as follows: The arrow 25 denotes in FIG. 1 the direction in which the input assembly (including the carrier 10 and the cheek 12) rotates when one of the linings 11 transmits torque from the engine to the carrier 10. The coil springs 19 to 24 then transmit torque to the output assembly including the hub 1 and the flange 3 so that the shaft 2 is driven in the same direction. The arrow 26 denotes the direction in which the shaft 2 can drive the input assembly 10, 12 when the vehicle is coasting. When the flange 3 begins to rotate relative to the input assembly 10, 12 in the direction of arrow 25, the coil spring 23 becomes effective ahead of the other coil springs because the edge faces 27 and 28 respectively bounding portions of the windows 8 and 17 are in register with one another. The dimensions of the windows 8, 17 (and of the corresponding window in the cheek 12), as considered in the circumferential direction of the flange 3, are identical; therefore, the coil spring 23 performs the additional function of automatically returning the flange 3 to a predetermined starting or zero angular position with reference to the input assembly 10, 12 as soon as the transmission of torque between the two assemblies is terminated or interrupted.

When the flange 3 completes a certain angular movement relative to the carrier 10 and cheek 12 (see the angle $alpha_1$ in FIG. 1), the spring 20 begins to store energy in addition to the spring 23. This is due to the fact that the edge face 29 in the window 5 of the flange 3 reaches and engages the adjacent end convolution of the spring 23 because the flange 3 continues to turn in the direction of arrow 25. As the flange 3 continues to turn in the direction of arrow 25, the remaining four coil springs (namely, the springs 19, 21, 22 and 24) begin to store energy one after the other in a predetermined sequence which is a function of the dimensions of the respective windows. It is clear, however, that two or more coil springs can become effective simultaneously. For example, the spring 23 can begin to store energy simultaneously with the spring 22, 24, 21, 20 or 19, and so forth.

The situation is analogous when the flange 3 begins to turn in the direction of arrow 26. It is not necessary that the angles through which the flange 3 must turn in the direction of arrow 26, in order to cause selected coil springs to store energy, be identical with those when the flange 3 turns in the direction of arrow 25. The rivets 12a and the radially extending edge faces 30, 31 bounding the corresponding notches 3a of the flange 3 determine the maximum extent of relative angular movement between the flange and the input assembly 10, 12 in the direction of arrow 25 or 26.

When the carrier 10 and the member 12 turn through an angle $alpha_2$ (note FIG. 1), the rivets 12a reach the radially extending edge faces 30 of the flange 3 (it is assumed that the parts 10 and 12 turn in the direction of arrow 25). If the parts 10 and 12 turn in the direction of arrow 26, the rivets 12a engage the edge faces 31 when the input assembly 10, 12 completes an angular movement through the same angle ($alpha_2$), it being assumed that the rivets 12a are normally disposed centrally of the respective notches 3a.

The outer torsional vibration damping unit which serves to generate friction in order to damp vibrations in the circumferential direction of the flange 3 comprises an annular disc-shaped friction generating component 32 which surrounds the hub 1 and is disposed between the right-hand side of the flange 3 (as viewed in FIG. 2) and the cheek 12 of the input assembly. The radially inner portion of the component 32 is flanked by two ring-shaped friction pads 33 and 34; the pad 33 is disposed between the flange 3 and the component 32, and the pad 34 is installed between the component 32 and the cheek 12. The outer damping unit further comprises a second annular component 38 which is a dished spring and is installed between the carrier 10 and the flange 3 in such a way that the radially innermost portion of the spring 38 reacts against the inner side of the carrier 10 while the radially outermost portion of this spring bears against axially extending portions or fingers 37 of the component 32. The fingers 37 extend through apertures in the flange 3; such apertures can constitute inward extensions of the respective windows (4 to 9) in the flange 3.

FIG. 1 shows that the arms 37 of the component 32 extend through the radially innermost portions (apertures) of the corresponding windows 4 to 9 in the flange 3. The width of the apertures for the arms 37 of the component 32 is selected in such a way that the flange 3 can turn with reference to the arms 37 through an angle $alpha_3$ in one direction (arrow 25) and through an angle $alpha_4$ in the opposite direction (arrow 26).

The radially outermost portion of the component or spring 38 can be provided with radially outwardly extending arms which alternate with the arms 37 of the component 32. The purpose of the component 38 is to bias the component 32 against the friction pad 34, i.e., toward the inner side of the cheek 12 of the input assembly.

The inner torsional vibration damping unit of the clutch plate comprises a resilient element here shown as an annular undulate spring 36, and a ring-shaped friction pad 35. The spring 36 bears against the inner side of the carrier 10 radially inwardly of the component 38 and biases the friction pad 35 against the adjacent side of the flange 3 in immediate or close proximity of the peripheral surface of the hub 1. It will be noted that the axially stressed spring 36 urges the cheek 12 of the input assembly 10, 12 toward the respective side of the flange 3, i.e., against the friction pad 34 which, in turn, urges the component 32 against the friction pad 33 so that the latter bears against the flange 3.

It will be noted that the friction pad 34 is biased (a) by the component 38 (by way of the component 32) to bear against the inner side of the cheek 12, and (b) by the resilient element 36 (via carrier 10, rivets 12a and cheek 12) to bear against the corresponding side of the component 32. The friction pads 33 and 35 are stressed solely by the resilient element 36. The component 38 and the friction pad 34 are designed in such a way that the frictional moment which is generated thereby exceeds the frictional moment which is generated by the friction pad 33 and resilient element 36.

When the flange 3 is rotated in the direction of the arrow 25 or in the direction of arrow 26, the friction pads 33 and 35 generate friction ahead of the friction pad 34. Such so-called idling friction is effective while the flange 3 turns through the aforementioned angle alpha$_3$ or alpha$_4$. This is due to the fact that, in view of the aforementioned greater frictional moment during such stage of angular movement of the flange 3 relative to the carrier 10 and the cheek 12 or vice versa, the component 32 does not change its angular position relative to the carrier 10 and cheek 12.

When the flange 3 completes its angular movement through the angle alpha$_3$ or alpha$_4$, the edge faces 39 or 40 in the windows 4 to 9 of the flange 3 engage the edge faces 41 or 42 of the arms 37 on the component 32 of the outer damping unit so that the component 32 begins to share the angular movement of the flange. This entails that the component 32 turns relative to the carrier 10 and the cheek 12 until the rivets 12a reach the edge faces 30 or 31 in the corresponding notches 3a of the flange 3. During such stage of angular movement of the flange 3 relative to the assembly 10, 12, a relatively high (i.e., pronounced) frictional moment is generated between the component 32 or the friction pad 34 on the one hand and the cheek 12 on the other hand. Additional friction develops between the component 38 and the carrier 10. The friction pad 35 is effective during each and every stage of relative angular movement between the flange 3 and the input assembly 10, 12. On the other hand, the friction pad 33 ceases to generate friction when the component 32 begins to turn with the flange 3, i.e., the friction pad 33 is effective only as long as the component 32 is free to turn relative to the flange 3 and/or vice versa.

In order to ensure that the component 32 of the outer damping unit assumes a predetermined angular position relative to the flange 3 when the damping unit including the components 32 and 38 is inactive, the component 32 is formed with one or more bifurcated projections, e.g., with two projections, which extend radially outwardly. The spacing between the two prongs 43, 44 of each of these projections (as well as the angular spacing of the two projections, as considered in the circumferential direction of the hub 1) is selected in such a way that the radially extending edge faces 45, 46 of the prongs 43, 44 bounding the cutouts between the prongs of the respective projections register with the edge faces 47 and 48 respectively bounding portions of the windows 13 and 16 to engage the corresponding end convolutions of the coil springs 19 and 22. This ensures that, when the component 32 assumes its starting or neutral position, the edge faces 45 and 46 of its prongs 43, 44 respectively register with the edge faces 47 and 48 in the windows 13 and 16.

Figure 3:
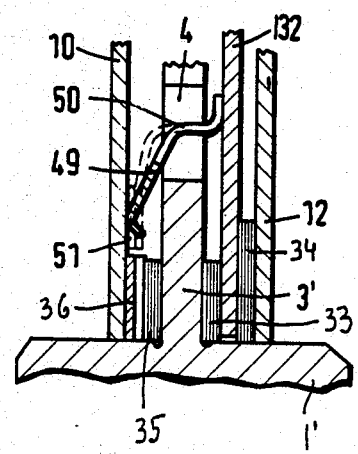
FIG. 3 is a fragmentary axial sectional view of a modified clutch plate wherein the hub is integral with the flange and the arms are provided on the resilient component of the outer torsional vibration damping unit.

FIG. 3 illustrates a portion of a modified clutch plate which is provided with a different outer damping unit. Furthermore, the hub 1' is integral with the flange 3'. The friction generating component 132 of the outer damping unit does not have any axially extending arms and is flanked by the friction pads 33, 34 the same as in the embodiment of FIGS. 1 and 2. The resilient component 49 of the outer damping unit has axially extending portions or arms 50 which extend through apertures in the flange 3' to bear directly against the component 132. The rightmost portions of the arms 50 (as viewed in FIG. 3) are preferably non-rotatably secured (e.g., soldered) to the component 132 so that the components 132, 49 can rotate as a unit. The radially innermost portion of the component 49 (which constitutes a dished spring) reacts against the inner side of the carrier 10. The latter is rigidly connected with the cheek 12, e.g., in a manner as described in connection with and as shown in FIGS. 1 and 2. As shown in FIG. 3 by broken lines, a further friction pad 51 can be inserted between the component 49 and the carrier 10. The same holds true for the embodiment of FIGS. 1 and 2, i.e., a further friction pad can be inserted between the component 38 and the carrier 10.

The construction of the inner damping unit (including an undulate resilient element 36 and a friction pad 35) is or can be the same as that of the inner damping unit in the embodiment of FIGS. 1 and 2.

An important advantage of the improved torque transmitting device is that its outer damping unit consists of a small number of very simple, inexpensive and compact components. This renders it possible to install these components in existing clutch plates and to thus greatly enhance the torsional vibration damping characteristics of such clutch plates. The components of the outer damping unit contribute little (if anything) to the dimensions of the improved device, as considered in the axial direction of the input and output assemblies. As can be seen in FIG. 2, the dimensions of the outer damping unit (as considered in the radial direction of the input and output assemblies) can be readily selected in such a way that the components of this damping unit need not extend radially outwardly beyond the coil springs 19 to 24. In fact, and as can also be seen in the drawing, the radial dimensions of the components 32 and 38 or 49 and 132 can be selected in such a way that these components are disposed entirely within the confines of the annulus of coil springs 19 to 24. This is desirable and advantageous because such components 32 and 38 or 49 and 132 add little, if anything, to the bulk and inertia of the torque transmitting device.

The inner damping unit can be designed to oppose rotation of the input and output assemblies relative to each other during that stage or those stages of relative rotation when the outer damping unit is ineffective, i.e., while the apertures of the flange 3 or 3' are free to rotate relative to the arms 37 or 50. In the illustrated embodiments, the inner damping unit opposes rotation of the flange 3 or 3' relative to the input assembly and/or vice versa during each and every stage of rotation of the input and output assemblies relative to one another. The feature that the components 32, 38 or 132, 49 of the outer damping unit are in direct engagement with one another also contributes to compactness of the torque transmitting device, as considered in the axial direction of the input and output assemblies, as well as to a reduction of the overall weight of such device.

The provision of friction pad 34 between the component 32 or 132 of the outer damping unit and the adjacent disc-shaped portion (12) of the input assembly renders it possible to regulate the damping action of the outer damping unit with a high degree of predictability i.e., so that the damping action is best suited for the particular application of the torque transmitting device. The same holds true for the friction pad 51 between the second component (49) of the outer damping unit and the adjacent discshaped portion (10) of the input assembly, as well as for the friction pad 33 between the component 32 or 132 and the flange 3 or 3', i.e., these friction pads also contribute to predictability of the damping action.

It has been found that the improved damping units eliminate rattling and/or other noise when the torque transmitting device is in use. This is due to the fact that the axially stressed parts 38, 36 or 49, 36 prevent any uncontrolled movements of various parts in the axial direction of the device. Furthermore, the selected damping action remains unchanged for practically unlimited periods of time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A torque transmitting device, particularly a clutch plate for use in friction clutches of automotive vehicles, comprising a rotary output assembly; a rotary input assembly coaxial with and arranged to transmit torque to said output assembly, said assemblies being rotatable relative to each other through a predetermined angle and one of said assemblies including a substantially disc-shaped portion; energy storing means interposed between and arranged to yieldably oppose rotation of said assemblies relative to each other; and a third assembly constituting torsional vibration damping means installed in the path of transmission of torque between said input and output assemblies and including a friction generating first component at one side and an axially stressed resilient second component at the other side of said disc-shaped portion, said second component reacting against the other of said input and output assemblies and bearing directly against said first component, at least one of said components having at least one portion extending substantially axially through said disc-shaped portion and the other of said components bearing axially against said portion of said one component, said components cooperating to frictionally oppose relative rotation of said input and output assemblies at least through a predetermined portion of said angle.

2. The device of claim 1, wherein said input assembly comprises a carrier of friction linings and said output assembly includes a hub having a flange which constitutes said disc-shaped portion.

3. The device of claim 1, wherein said second component is an annular dished spring.

4. The device of claim 1, wherein said other assembly includes a substantially disc-shaped portion and said second component reacts against the disc-shaped portion of said other assembly.

5. The device of claim 1, wherein said disc-shaped portion has apertures and said first component has substantially axially disposed arms extending through said apertures, said second component bearing against the arms of said first component.

6. The device of claim 1, wherein said one component has several portions extending through said disc-shaped portion with limited freedom of angular movement of said one component relative to said disc-shaped portion.

7. The device of claim 6, wherein said disc-shaped portion has apertures and said portions of said one component are substantially axially disposed arms extending through said apertures with limited freedom of angular movement of said one component and said disc-shaped portion relative to each other.

8. The device of claim 1, wherein said disc-shaped portion forms part of said output assembly and said input assembly includes two additional disc-shaped portions flanking the disc-shaped portion of said output assembly, one of said components being disposed between the disc-shaped portion of said output assembly and one of said additional disc-shaped portions and the other of said components being disposed between the disc-shaped portion of said output assembly and the other of said additional disc-shaped portions.

9. The device of claim 8, wherein one of said additional disc-shaped portions is an annular carrier of friction linings and the other of said additional disc-shaped portions is an annular cheek rigid with and spaced apart from said carrier, said output assembly comprising a hub having a flange which constitutes said disc-shaped portion of said output assembly.

10. The device of claim 1, further comprising a friction pad interposed between said second component and said other assembly.

11. The device of claim 10, wherein said one assembly is said output assembly and said input assembly comprises an additional disc-shaped portion which is in contact with said friction pad.

12. The device of claim 1, further comprising a friction pad interposed between said first component and said disc-shaped portion.

13. The device of claim 1, further comprising first and second friction pads flanking said first component, one of said friction pads bearing against said disc-shaped portion and the other of said friction pads bearing against said other assembly.

14. The device of claim 1, wherein said one component is said second component.

15. A torque transmitting device, particularly a clutch plate for use in friction clutches of automotive vehicles, comprising a rotary output assembly; a rotary input assembly coaxial with and arranged to transmit torque to said output assembly, said assemblies being rotatable relative to each other through a predetermined angle and one of said assemblies including a substantially disc-shaped portion; energy storing means interposed between and arranged to yieldably oppose rotation of said assemblies relative to each other; and a third assembly constituting torsional vibration damping means installed in the path of transmission of torque between said input and output assemblies and including a friction generating first component at one side and an axially stressed resilient second component at the other side of said disc-shaped portion, said second component reacting against the other of said input and output assemblies and bearing directly against said first component, at least one of said components extending through said disc-shaped portion and said components cooperating to frictionally oppose relative rotation of said input and output assemblies at least through a portion of said angle, said second component including an annular dished spring having an outer portion and an inner portion, as considered in the radial direction of said output assembly, said outer portion bearing against said first component and said inner portion reacting against said other assembly.

16. The device of claim 15, wherein said one assembly is said output assembly and said other assembly is said input assembly.

17. A torque transmitting device, particularly a clutch plate for use in friction clutches of automotive vehicles, comprising a rotary output assembly; a rotary input assembly coaxial with and arranged to transmit torque to said output assembly, said assemblies being rotatable relative to each other through a predetermined angle and one of said assemblies including a substantially disc-shaped portion; energy storing means interposed between and arranged to yieldably oppose rotation of said assemblies relative to each other; a third assembly constituting torsional vibration damping means installed in the path of transmission of torque between said input and output assemblies and including a friction generating first component at one side and an axially stressed resilient second component at the other side of said disc-shaped portion, said second component reacting against the other of said input and output assemblies and bearing directly against said first component, at least one of said components extending through said disc-shaped portion and said components cooperating to frictionally oppose relative rotation of said input and output assemblies at least through a portion of said angle; and second torsional vibration damping means interposed between said input and output assemblies and including an axially stressed resilient element and a friction pad adjacent to and biased by said resilient element, said resilient element reacting against one of said input and output assemblies and said friction pad bearing against the other of said input and output assemblies, said second component comprising an annular dished spring surrounding at least one of the parts including said resilient element and said friction pad.

18. A torque transmitting device, particularly a clutch plate for use in friction clutches of automotive vehicles, comprising a rotary output assembly; a rotary input assembly coaxial with and arranged to transmit torque to said output assembly, said assemblies being rotatable relative to each other through a predetermined angle and one of said assemblies including a substantially disc-shaped portion; energy storing means interposed between and arranged to yieldably oppose rotation of said assemblies relative to each other; and a third assembly constituting torsional vibration damping means installed in the path of transmission of torque between said input and output assemblies and including a friction generating first component at one side and an axially stressed resilient second component at the other side of said disc-shaped portion, said second component reacting against the other of said input and ouput assemblies and bearing directly against said first component, at least one of said components extending through said disc-shaped portion and said components cooperating to frictionally oppose relative rotation of said input and output assemblies at least through a portion of said angle, said second component including an annular dished spring having an outer portion and an inner portion, as considered in the radial direction of said output assembly, one of said inner and outer portions bearing against said first component and the other of said inner and outer portions reacting against said other assembly.

* * * * *